(12) United States Patent
Mousavi et al.

(10) Patent No.: US 8,682,612 B2
(45) Date of Patent: Mar. 25, 2014

(54) TREND ANALYSIS METHODS AND SYSTEM FOR INCIPIENT FAULT PREDICTION

(75) Inventors: Mirrasoul Mousavi, Cary, NC (US); Rohit Moghe, Atlanta, GA (US)

(73) Assignee: ABB Research Ltd, Zurich (CH)

( * ) Notice: Subject to any disclaimer, the term of this patent is extended or adjusted under 35 U.S.C. 154(b) by 539 days.

(21) Appl. No.: 12/642,381

(22) Filed: Dec. 18, 2009

(65) Prior Publication Data

US 2010/0161275 A1 Jun. 24, 2010

Related U.S. Application Data

(60) Provisional application No. 61/138,680, filed on Dec. 18, 2008.

(51) Int. Cl.
*G06F 17/18* (2006.01)

(52) U.S. Cl.
USPC ............. 702/179; 702/57; 702/58; 702/63; 702/181; 702/189; 342/537; 342/509; 340/636.1; 340/635; 700/295; 700/278

(58) Field of Classification Search
USPC ........ 702/63, 179, 181, 57, 58, 189; 324/537, 324/509; 340/636.1, 635; 700/295, 278
See application file for complete search history.

(56) References Cited

U.S. PATENT DOCUMENTS

| | | | | |
|---|---|---|---|---|
| 7,120,563 B2 * | 10/2006 | Bechhoefer et al. | ........... | 702/189 |
| 7,139,668 B2 * | 11/2006 | Bechhoefer | ................... | 702/58 |
| 7,346,475 B2 * | 3/2008 | Dimino et al. | ................. | 702/185 |
| 7,403,850 B1 * | 7/2008 | Boutin et al. | .................. | 701/107 |
| 7,512,503 B2 * | 3/2009 | Bechhoefer et al. | ............ | 702/58 |
| 7,526,100 B1 * | 4/2009 | Hartman et al. | .............. | 382/103 |
| 8,065,568 B2 * | 11/2011 | Watanabe et al. | ............ | 714/47.1 |
| 2002/0121902 A1 * | 9/2002 | Suzuki | .......................... | 324/509 |
| 2004/0122667 A1 * | 6/2004 | Lee et al. | ....................... | 704/233 |
| 2004/0230383 A1 * | 11/2004 | Bechhoefer et al. | ............. | 702/57 |
| 2004/0230385 A1 * | 11/2004 | Bechhoefer et al. | ............. | 702/57 |
| 2004/0230387 A1 * | 11/2004 | Bechhoefer | ...................... | 702/58 |
| 2006/0122525 A1 * | 6/2006 | Shusterman | ................... | 600/513 |
| 2008/0263012 A1 * | 10/2008 | Jones | ................................ | 707/3 |
| 2009/0009183 A1 * | 1/2009 | Mousavi et al. | ............... | 324/537 |
| 2009/0259346 A1 * | 10/2009 | Reed et al. | ...................... | 700/295 |
| 2011/0010118 A1 * | 1/2011 | Gaarder | .......................... | 702/60 |

FOREIGN PATENT DOCUMENTS

KR 719138 B1 * 5/2007

* cited by examiner

*Primary Examiner* — Carol S Tsai
(74) *Attorney, Agent, or Firm* — Michael C. Prewitt; Robert P. Nupp; Denis Ticak

(57) ABSTRACT

There is described herein the extension of the application of the Laplace Test Statistic for trend analysis and prediction of incipient faults for power systems. The extensions consider the situation where two parameters believed to contribute explicitly to the eventual failure are monitored. The developed extensions applied to actual incipient failure events provide promising results for prediction of the impending failure. It is demonstrated that by incorporating two parameters in the trend analysis, the robustness to outliers is increased and the flexibility is augmented by increasing the degrees of freedom in the generation of the alarm signal.

8 Claims, 19 Drawing Sheets

Flowchart for Implementing WMLTS

Fig. 1. Illustration of arrival times of N chronologically ordered events

Fig. 2. The LTS applied on a growing window

Fig. 3 Flowchart for Implementing WMLTS

Fig. 4. Behavior of the WMLTS when the frequency increases

Fig. 5. Behavior of the WMLTS when the frequency decreases

Fig. 6. Behavior of the WMLTS when the frequency is constant

Fig. 7. The decision quadrant

Fig. 8 Flowchart for Trend Analysis Using 2D-LTS Approach

Fig. 9. Dynamic threshold enclosures for the 2D-LTS

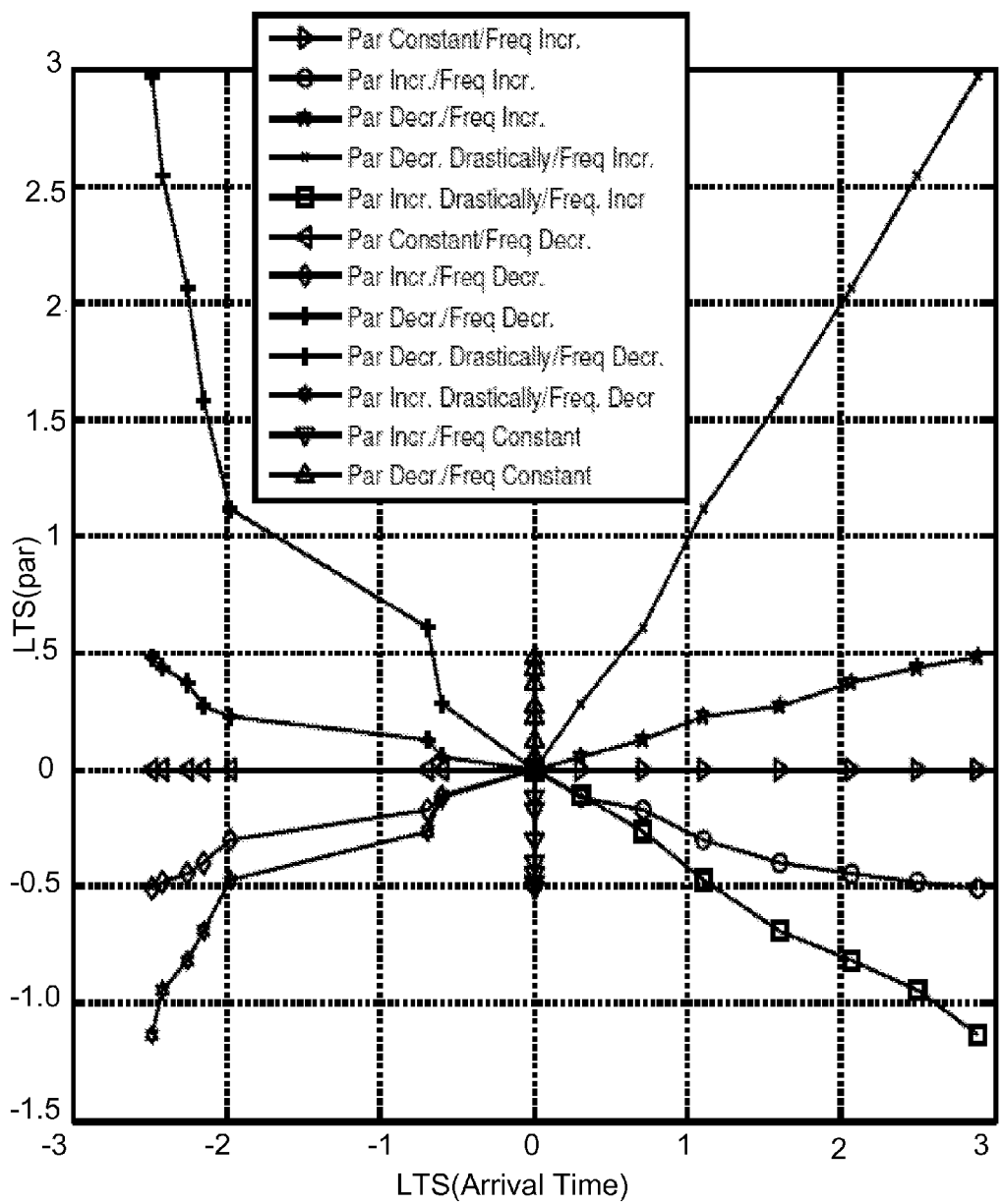
Fig. 11 Behavior of the 2D-LTS Under Various Scenarios

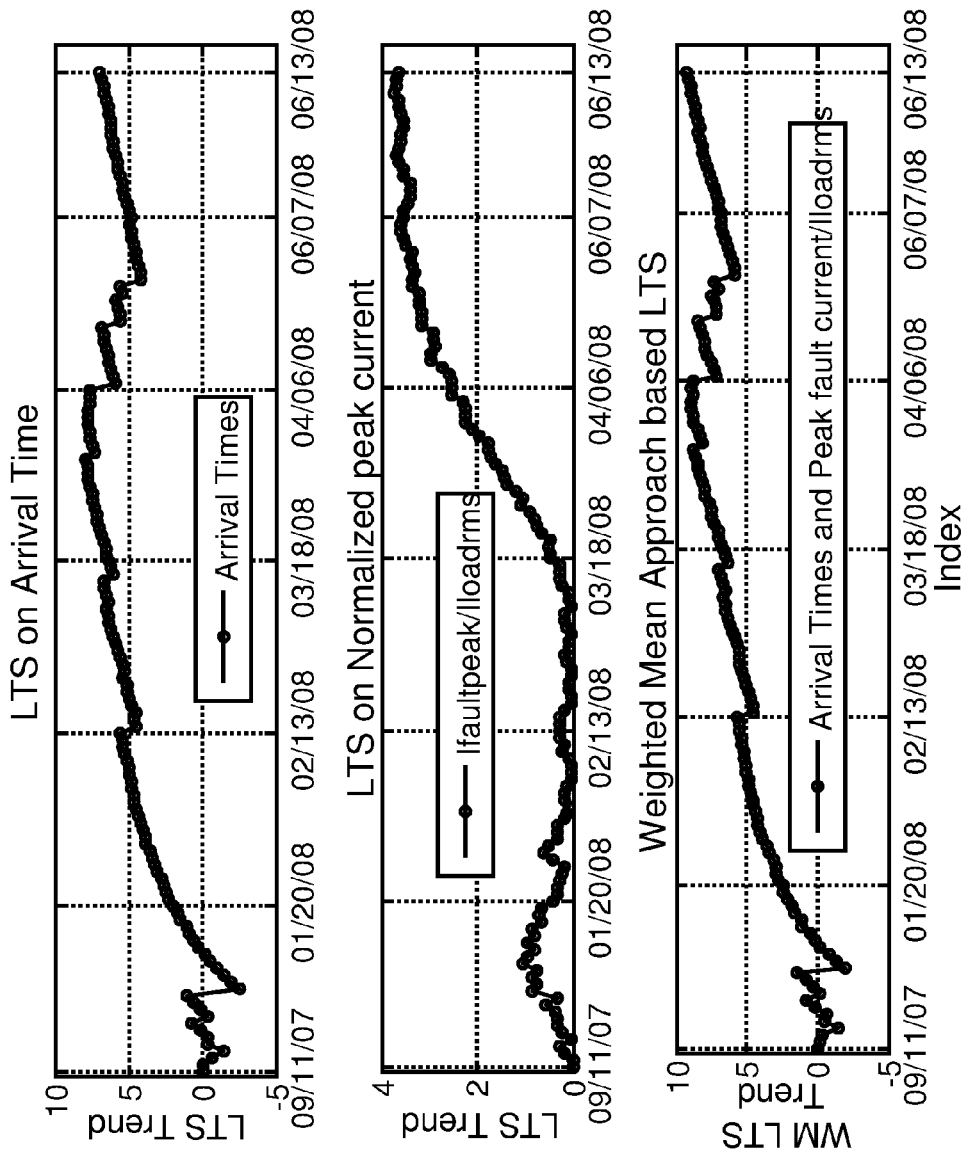
Fig. 12. Trend analysis on the incipient failures

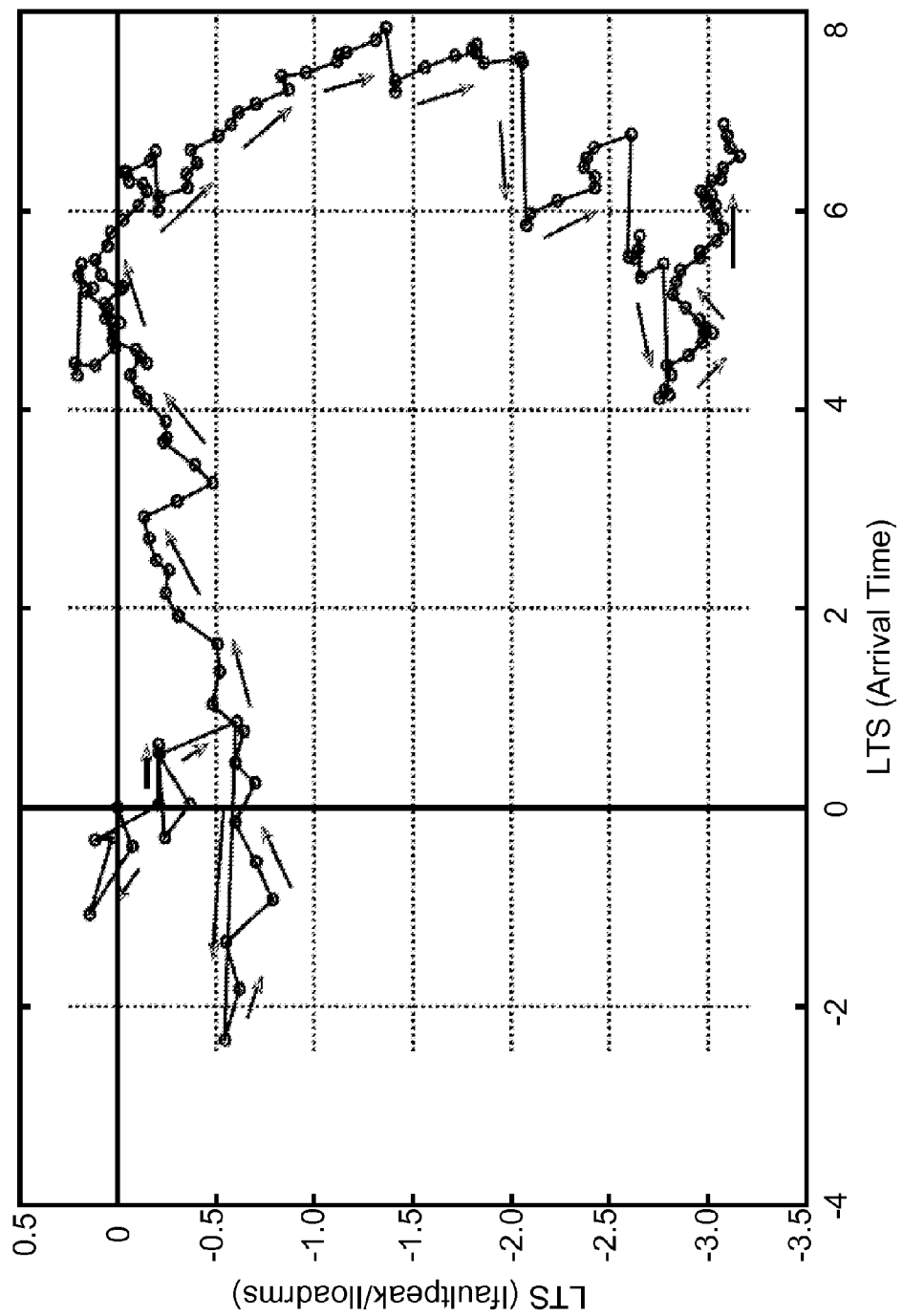
Fig. 13 Application of 2D LTS Approach to Incipient Failures

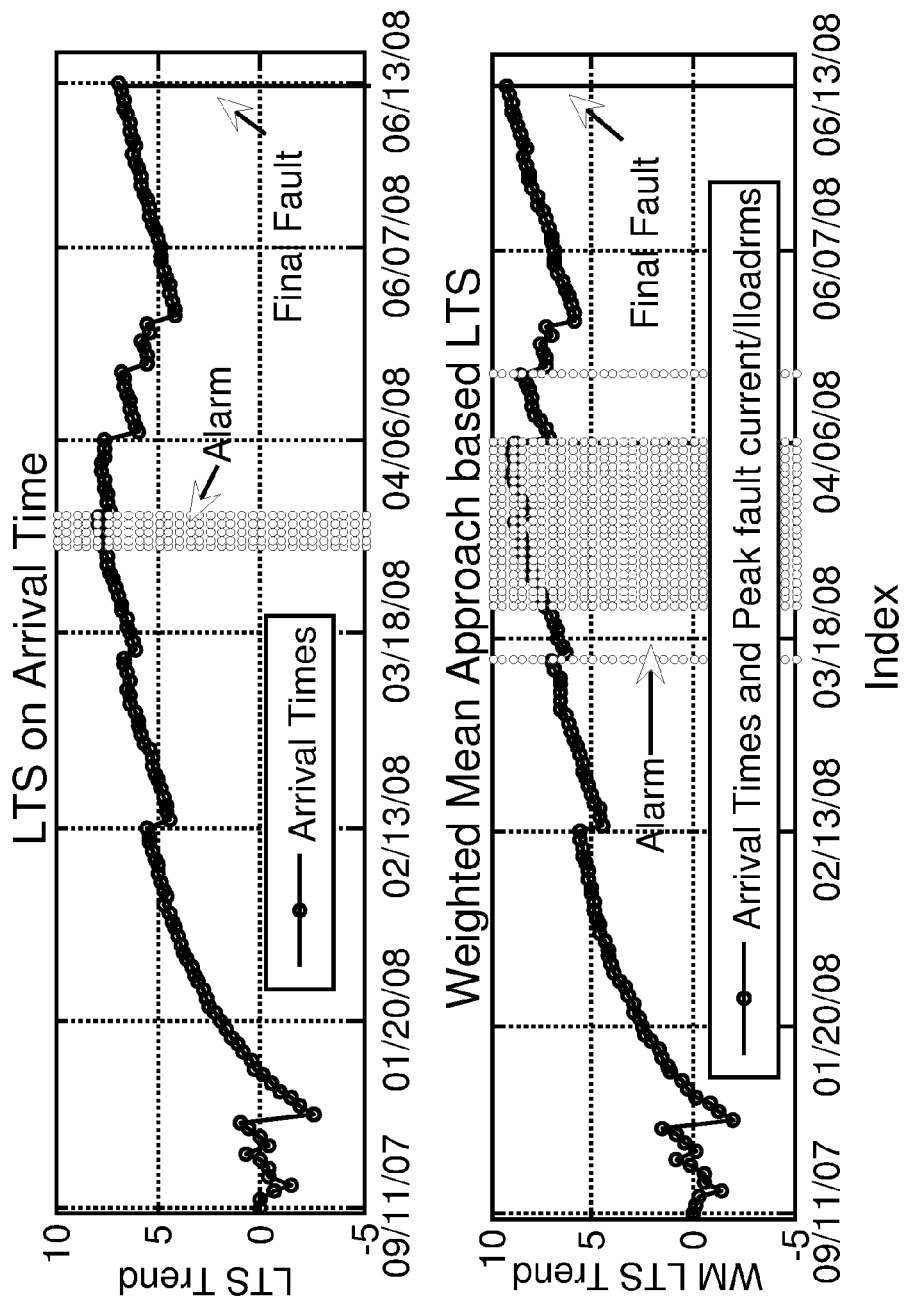
Fig. 14. Alarm times for a threshold value set at 47% of the upper bound

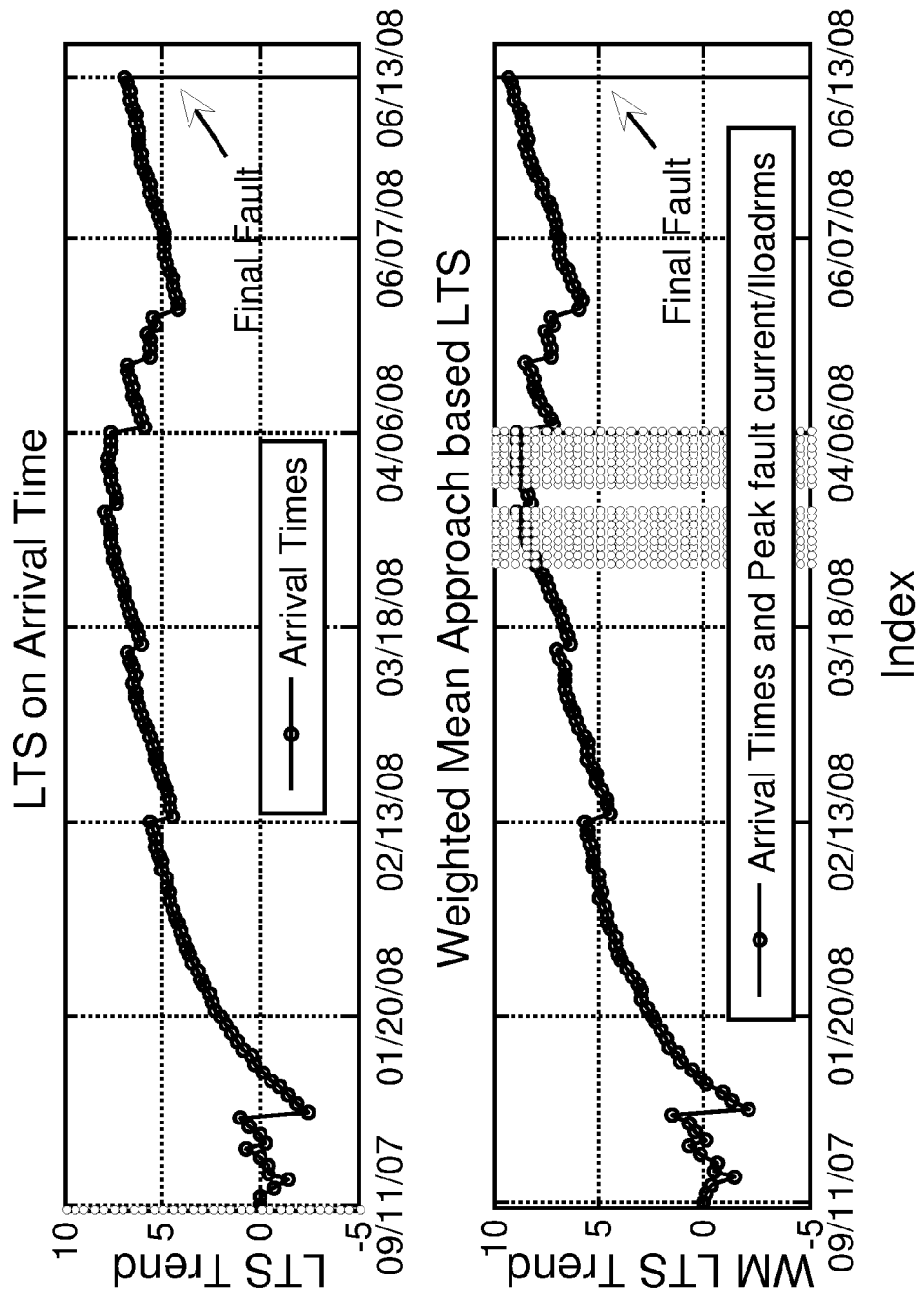
Fig. 15. Alarm times for a threshold value set at 50% of the upper bound

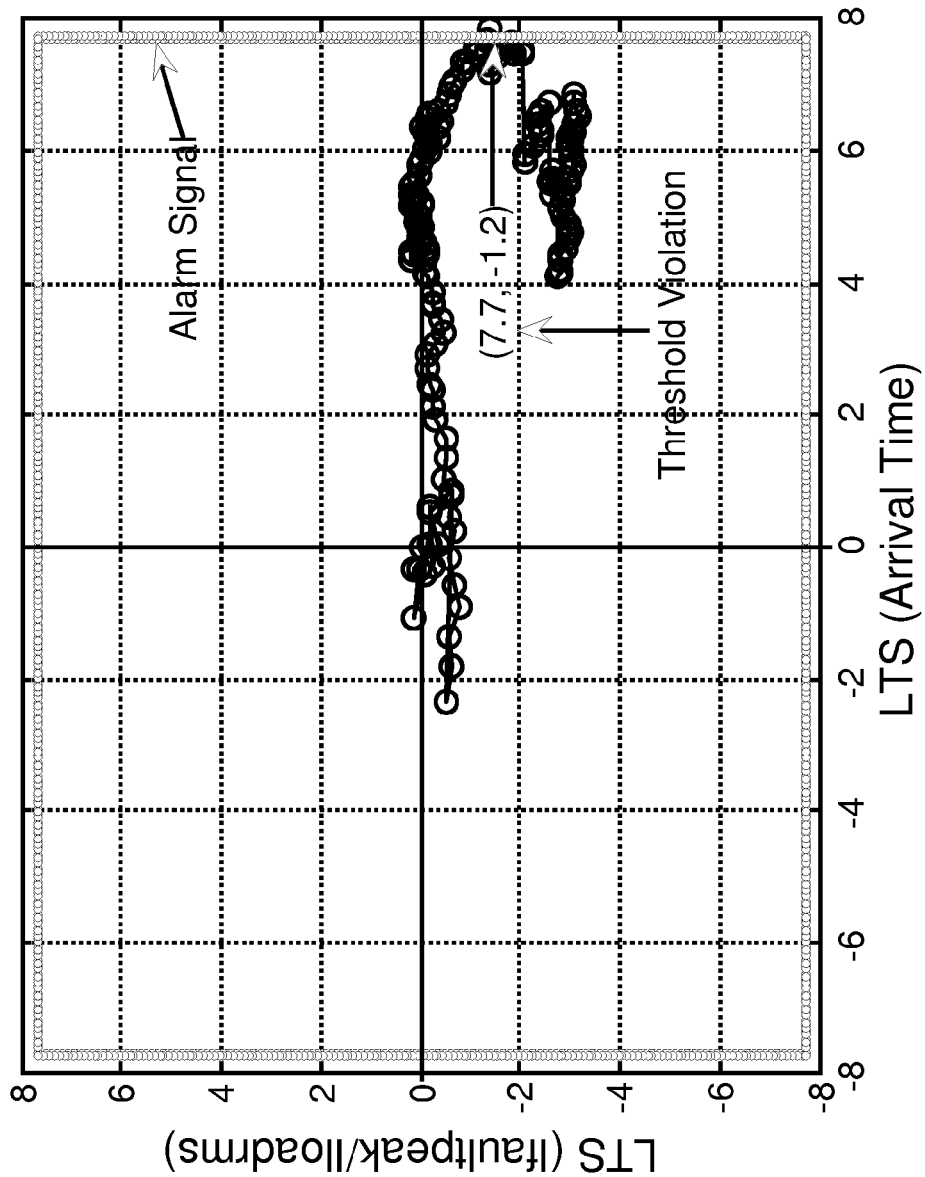
Fig. 16. Alarm times for a threshold value set at 47% of the upper bound

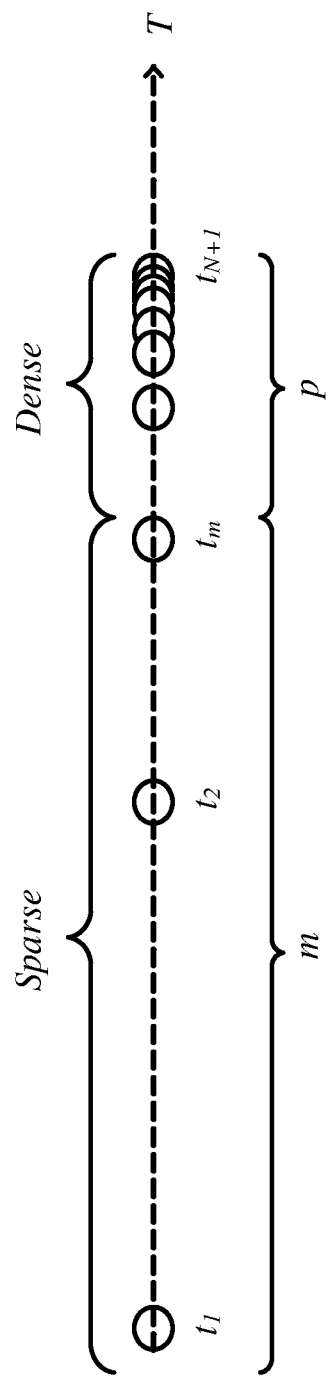
Fig. 17. Assumption on the arrival times

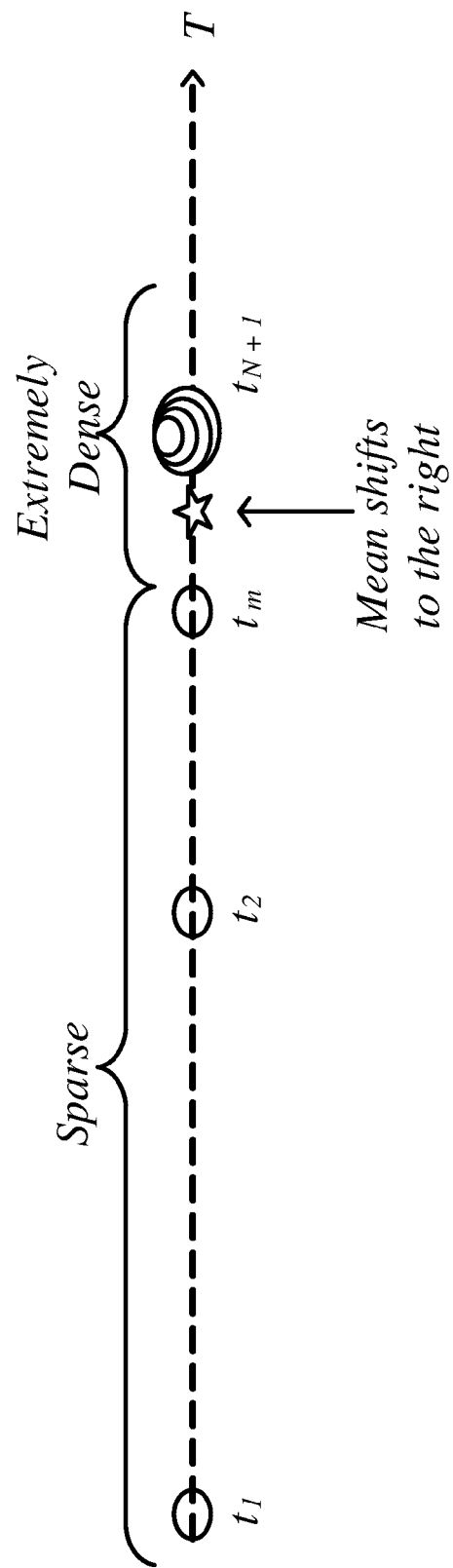
Fig. 18. Mean shifts to the right as the event frequency increases

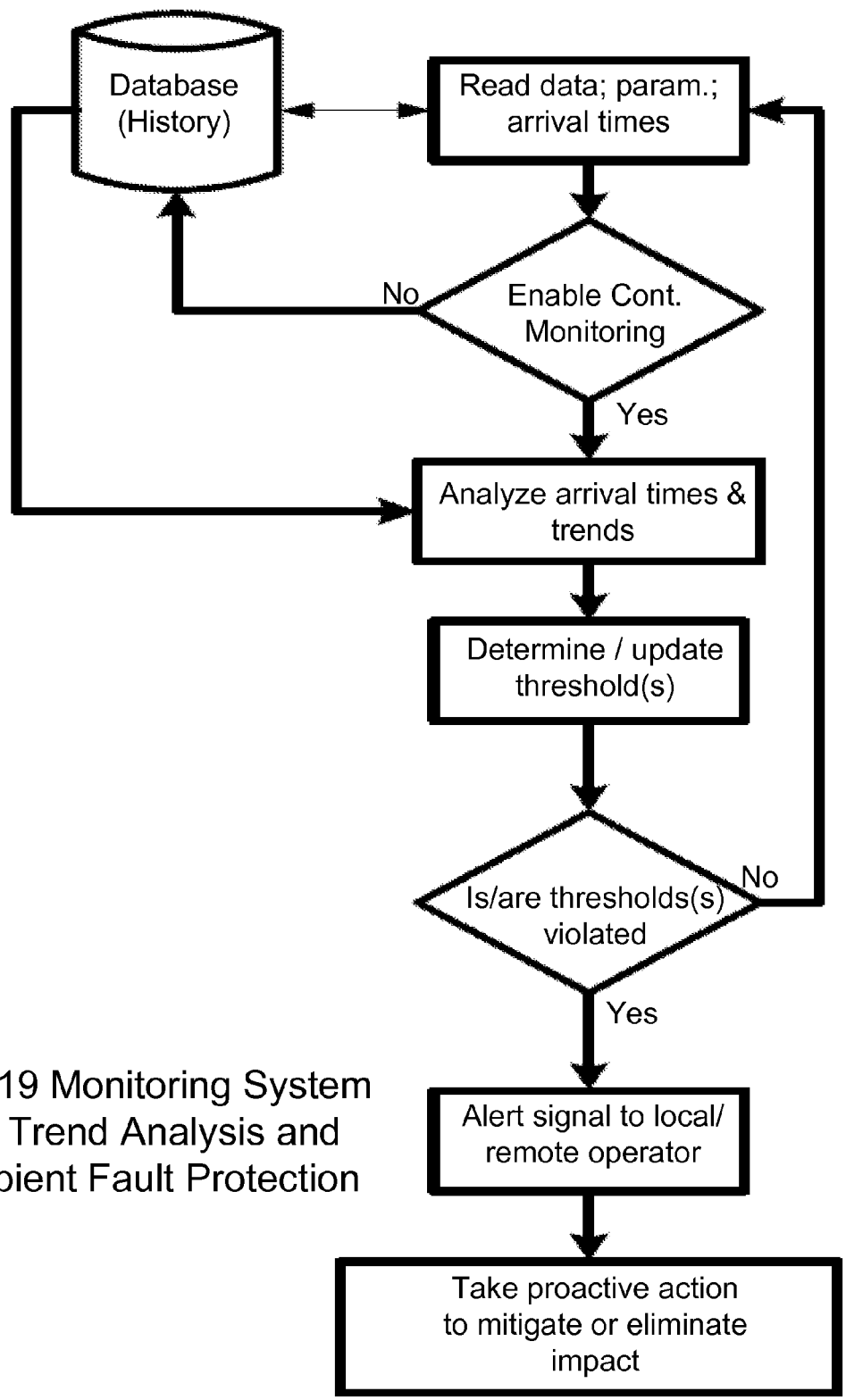
Fig. 19 Monitoring System for Trend Analysis and Incipient Fault Protection

TREND ANALYSIS METHODS AND SYSTEM FOR INCIPIENT FAULT PREDICTION

This application claims priority from Provisional Application No. 61/138,680 filed on Dec. 12, 2008 titled Trend Analysis Methods and System for Incipient Fault Prediction, the contents of which are incorporated by reference in their entirety.

BACKGROUND

Today more than ever, electric utilities are faced with the challenges of optimization of their resources, reduction of operating costs, and delivery of power reliably to their customers. In addition, the utility sector has an aging workforce. There are a number of occupational situations in utility operations where decision-making relies heavily on experience and lack of this body of knowledge may lead to inferior decision-making and reduced reliability. An effective way to tackle these challenges is through utility automation and automated asset monitoring and decision making in particular.

In distribution systems, underground feeder maintenance and upkeep of medium voltage cables make up a significant chunk of operations and maintenance (O&M) expenditures. These cables may suffer from degradation over time due to various environmental, electrical, and mechanical factors. Deterioration of the assets gives rise to incipient faults that may be benign in the early stages but, over time, may lead to a catastrophic failure.

Deterioration of insulating materials typically conveys itself as sporadic arcing, which is believed to increase in severity as the equipment nears failure. Most often, the insulation material undergoes a gradual aging process before a catastrophic fault occurs. During this period, the electrical properties of the insulation alter adversely and incipient fault behavior commences. Incipient behavior is portrayed as a spike or series of spikes (burst) in the measured current waveforms. This is a direct result of an ongoing aging and deterioration process in the insulation medium used in power equipment, such as distribution cables and transformers. The abnormalities introduced by incipient behavior are indicators of system health. As the system ages, this atypical behavior tends to exhibit itself conspicuously. Persisting incipient abnormalities can eventually lead to a catastrophic failure and unscheduled outages.

Incipient faults convey intermittent, asymmetric, and sporadic spikes, which are random in magnitude and could involve sporadic bursts as well. They exhibit complex, non-linear, and dynamic characteristics and may not last for a definite period. They may persist in the system from as little as several days to several years. Incipient faults do not typically draw sufficient current from the line to activate the protective devices. In addition, they may manifest themselves in the high frequency spectrum of the current signal.

In the past, the Laplace test statistic (LTS) was used as a simple but powerful tool for identifying the trend of an incipient failure from the recorded precursor events. This technique is popular in reliability studies and has been proposed for trend analysis in power systems for decision making regarding asset maintenance.

Traditional LTS uses the arrival times of incipient failure events as the only parameter for determining the statistical trend. This way, each event is treated equally in terms of its contribution to the eventual failure. But, consider a situation where one needs to monitor two parameters that are believed to contribute explicitly to the eventual failure. This requirement would not be fulfilled by the conventional trend analysis as it does not explicitly take any other parameter, apart from the arrival time, into consideration.

The Laplace Test Statistic applied to a series of chronologically ordered events explains the rate of arrival of the events in the observation window. The arrival times of N chronologically ordered events are shown, for example, in FIG. 1. When monitoring incipient failures, each recorded instance of an incipient failure is regarded as an event.

Let $t_{N+1}$ be the time at which the fault occurred, N be the number of incipient failure events that occurred before the fault, and $\delta$ be the time between successive events. The LTS is given by (1):

$$LTS = \frac{\frac{1}{N}\sum_{i=1}^{N}\sum_{j=1}^{i}\delta_j - \frac{t_{N+1}}{2}}{t_{N+1} \cdot \sqrt{\frac{1}{12N}}} \quad (1)$$

Where
N=the number of incipient events recorded,
$\delta_j$=the inter-arrival times,
$t_i$=time at the $i^{th}$ sample
Equation (1) can be reduced to $$LTS = \frac{\frac{1}{N}\sum_{i=1}^{N}(\delta_1 + \delta_2 + \ldots + \delta_i) - \frac{t_{N+1}}{2}}{t_{N+1} \cdot \sqrt{\frac{1}{12N}}} \quad (2)$$

And further $$LTS = \frac{\frac{\sum_{i=1}^{N} t_i}{N} - \frac{t_{N+1}}{2}}{t_{N+1} \cdot \sqrt{\frac{1}{12N}}} \quad (3)$$

Equation (3) defines the LTS in its most common form that is applied to a series of events in order to determine whether a statistical trend is present. The LTS behavior has a straightforward interpretation under different assumptions. Under the assumption that the events occur at a constant rate, $\delta$ would be a constant over the interval $(t_1, t_N)$. Therefore, the mean of all $t_i$'s would be at the midpoint of the interval. Consequently, the LTS value would be very close to zero. However, if the rate of occurrence of events increases with time and becomes high near the end of the interval, the LTS value would be positive and large. Finally, if the events decrease near the end of the interval, the LTS value would be negative and small.

In practice, identifying a statistical trend of events is important for monitoring purposes but to use this information for prediction, the trend needs to be quantified and compared against a threshold for alarming purposes. An empirical upper bound for the LTS is:

$$LTS_{max} \approx \sqrt{3N} \quad (4)$$

In practice the theoretical upper bound and may never be reached due to the intermittent on/off nature of incipient faults. Nevertheless, for practical purposes, a percentage of this theoretical upper bound may be used for setting an alarm threshold.

For on-line applications, a growing window of events (see FIG. 2) can be used for calculating the trend trajectory over time. In this case, more samples are added with increased number of incipient failure events and the resulting LTS values corresponding to each window are used for alarming purposes. Intuitively, the value of N would not be a constant. Therefore, according to equation (4), the threshold value would change with the increase in the window size. In such a case, the calculated LTS values would be compared against a dynamic threshold that is updated at each iteration.

Despite the above referenced advantages of LST applications, drawbacks persist. In particular, the LST methods above fail to adequately account for a plurality of parameters.

SUMMARY OF THE INVENTION

According to one aspect of the present invention, a computer program product is provided which includes program instructions which, when executed by a processor performs a method including receiving data including a first parameter and a second parameter, the first parameter representing the time of an incipient event and the second parameter representing a characteristic of the incipient event. A Laplace test statistic is determined using the first parameter and the second parameter. The Laplace test statistic is compared against a threshold and if the Laplace test statistic is greater than the threshold, an alarm signal is output.

BRIEF DESCRIPTION OF THE DRAWINGS

FIG. 11 is a chart showing the behavior of the 2D laplace test statistic under a variety of scenarios.

FIG. 12 is an exemplary trend analysis of incipient failures.

FIG. 13 shows the application of 2D Laplace test statistic approach.

FIG. 14 shows plots wherein WMLTS algorithm for alarm generation was used to obtain alarm signals for different thresholds.

FIG. 15 shows plots wherein WMLTS algorithm for alarm generation was used to obtain alarm signals for different thresholds.

FIG. 16 shows a dynamic threshold created using the 2D laplace test statistic algorithm for alarm generation.

FIG. 17 shows an exemplary series of events.

FIG. 18 shows an exemplary series of events.

FIG. 19 shows a flowchart for the process of a monitoring system using at least one of the Laplace test statistic methods of the present invention.

DETAILED DESCRIPTION

As discussed above, the original Laplace test statistic (hereinafter "LTS") approach only employs the arrival times of incipient failure events to determine the statistical trend. In this manner, each event is treated equally in terms of its contribution to an eventual failure. As will be hereinafter disclosed, the present invention extends the conventional LTS so that two parameters may be used. The present invention includes two embodiments, wherein a first is a weighted mean Laplace test statistic (hereinafter "WMLTS") approach and the second is a 2-D Laplace test statistic (hereinafter "2-D LTS") approach. Both the WMLTS and 2-D LTS approaches use more than one parameter for calculating the test statistic.

The Weighted Mean LTS Approach

This approach incorporates the effect of the second parameter as a "weight" on the arrival times, such that as the weight increases, it leads to a further increase in the trend. The weighting could be based on any parameter that provides additional information related to the incipient event. For example, the weighting could be based on: the magnitude of the incipient event, the total energy, the baseline load, or environmental conditions at the time of event. Thus, there are essentially two parameters—arrival times and the weight—that either compete with or assist each other in setting the trend for the incipient failures. This concept can be intuitively incorporated into the LTS equation by replacing the mean of the arrival times by a weighted average.

$$WMLTS = \frac{\left(\frac{\sum_{i=1}^{N}\sum_{j=1}^{i} \delta_j \omega_i}{\sum_{i=1}^{N} \omega_i} - \frac{t_{N+1}}{2}\right)}{t_{N+1} \cdot \sqrt{\frac{1}{12N}}} \quad (5)$$

Or simply $$WMLTS = \frac{\left(\frac{\sum_{i=1}^{N} \omega_i t_i}{\sum_{i=1}^{N} \omega_i} - \frac{t_{N+1}}{2}\right)}{t_{N+1} \cdot \sqrt{\frac{1}{12N}}} \quad (6)$$

Incorporating the effect of the second parameter as a "weight" on the arrival times disturbs the original probability distribution of the LTS values. The impact of this incorporation is that the assumptions made about the original distribution are no longer valid and can not be used for example to set thresholds. Therefore, care must be taken if the probability function characteristics are used for any subsequent analysis.

In order to explore the behavior of this extension, several different data sets were tested under various conditions of increasing, decreasing, and constant rate of events/weights. The data sets were of the form:

$T=[t_1, t_2, \ldots, t_{N+1}]$
$W=[\omega_1, \omega_2, \ldots, \omega_N]$

Figure 1:
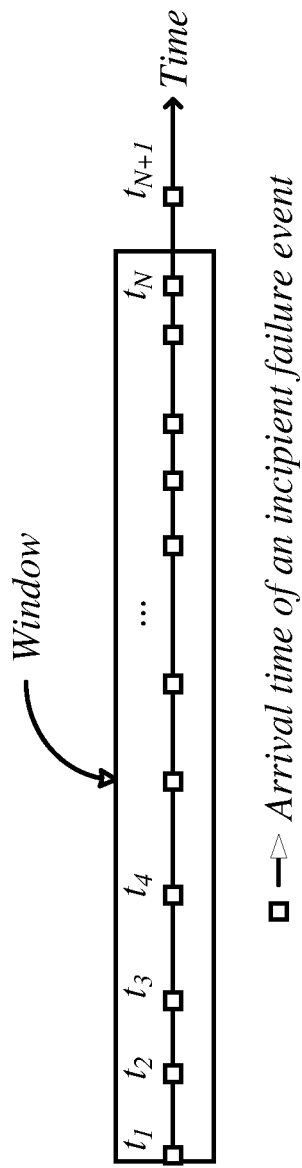
FIG. 1 is a visual representation of arrival times of N chronological events.
Figure 2:
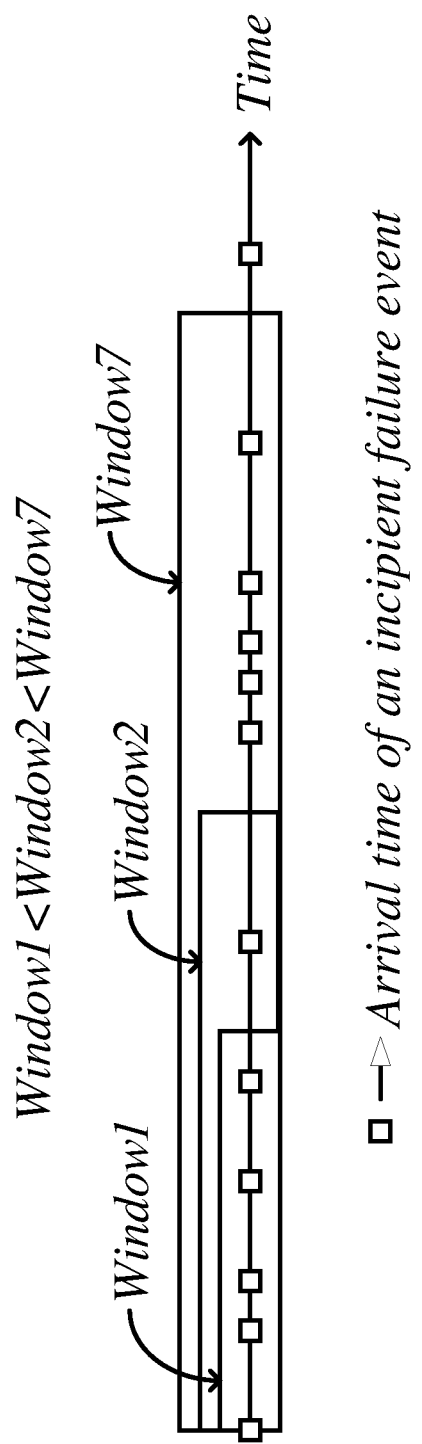
FIG. 2 is a visual representation of arrival times of N chronological events wherein different event windows are applied for LST.
Figure 3:
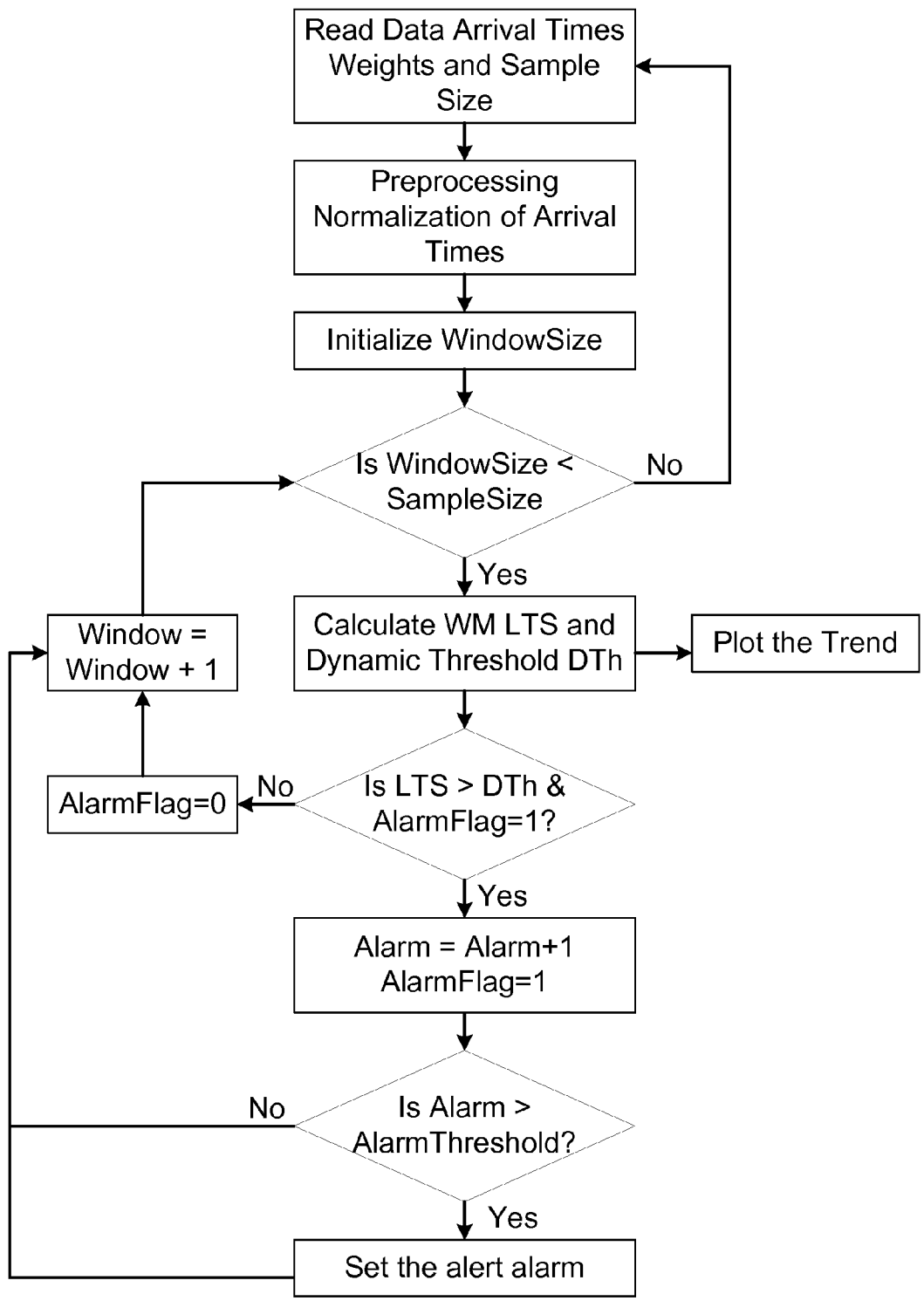
FIG. 3 is a flowchart for implementing a weighted mean Laplace test statistic.
Figure 4:
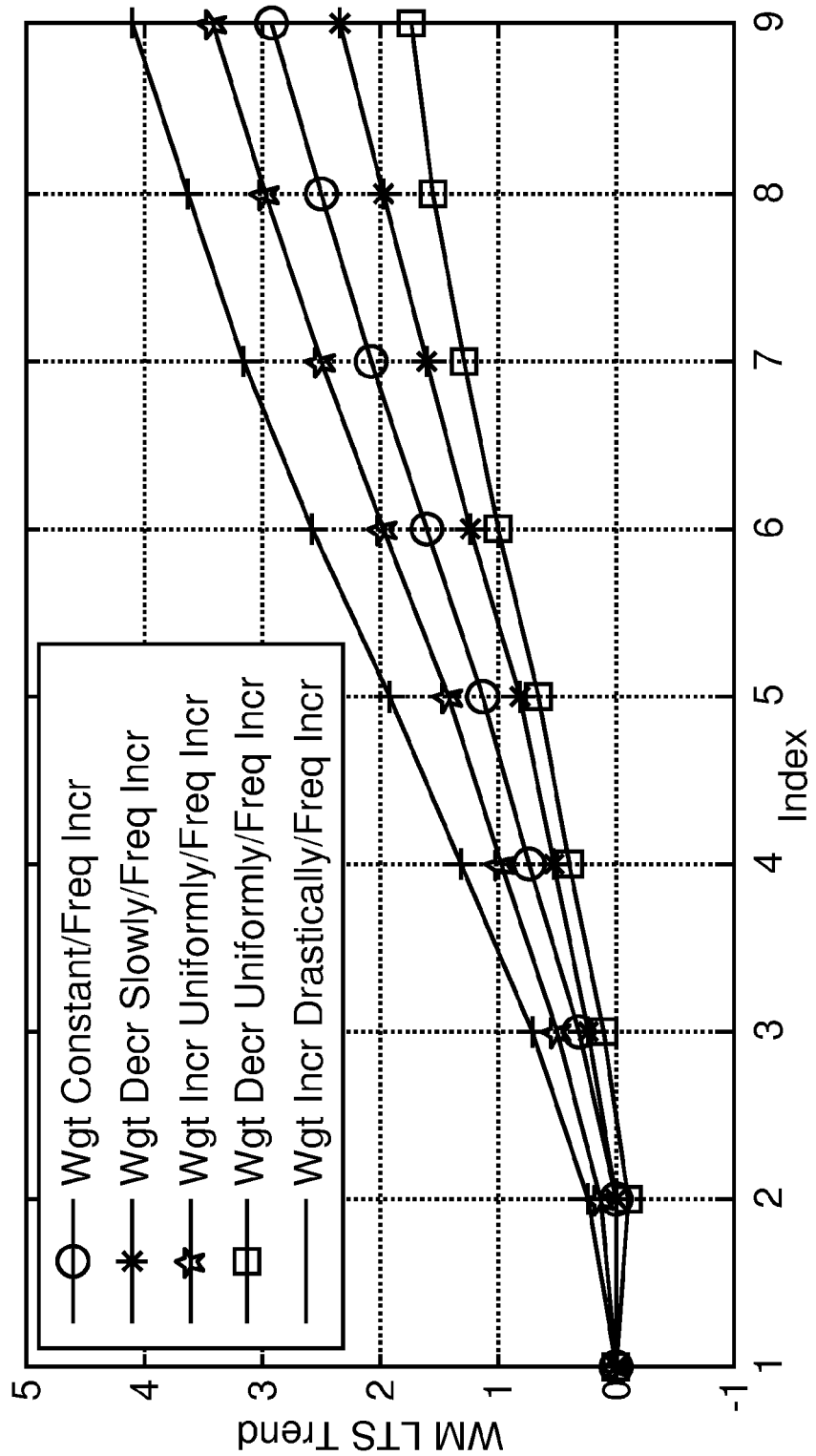
FIG. 4 is a chart showing the behavior of the weighted mean Laplace test statistic when frequency increases.
Figure 5:
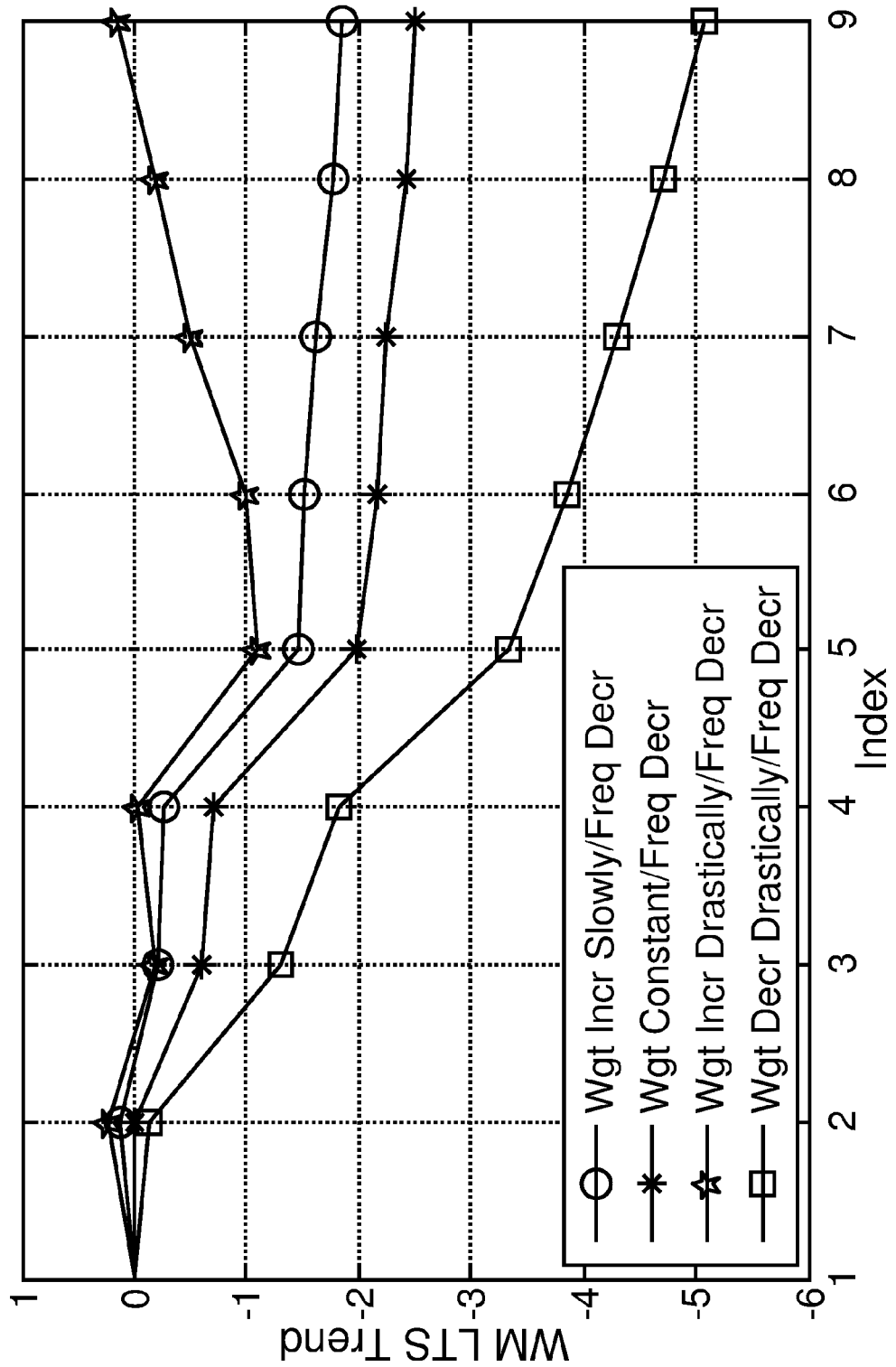
FIG. 5 is a chart showing the behavior of the weighted mean Laplace test statistic when frequency decreases.
Figure 6:
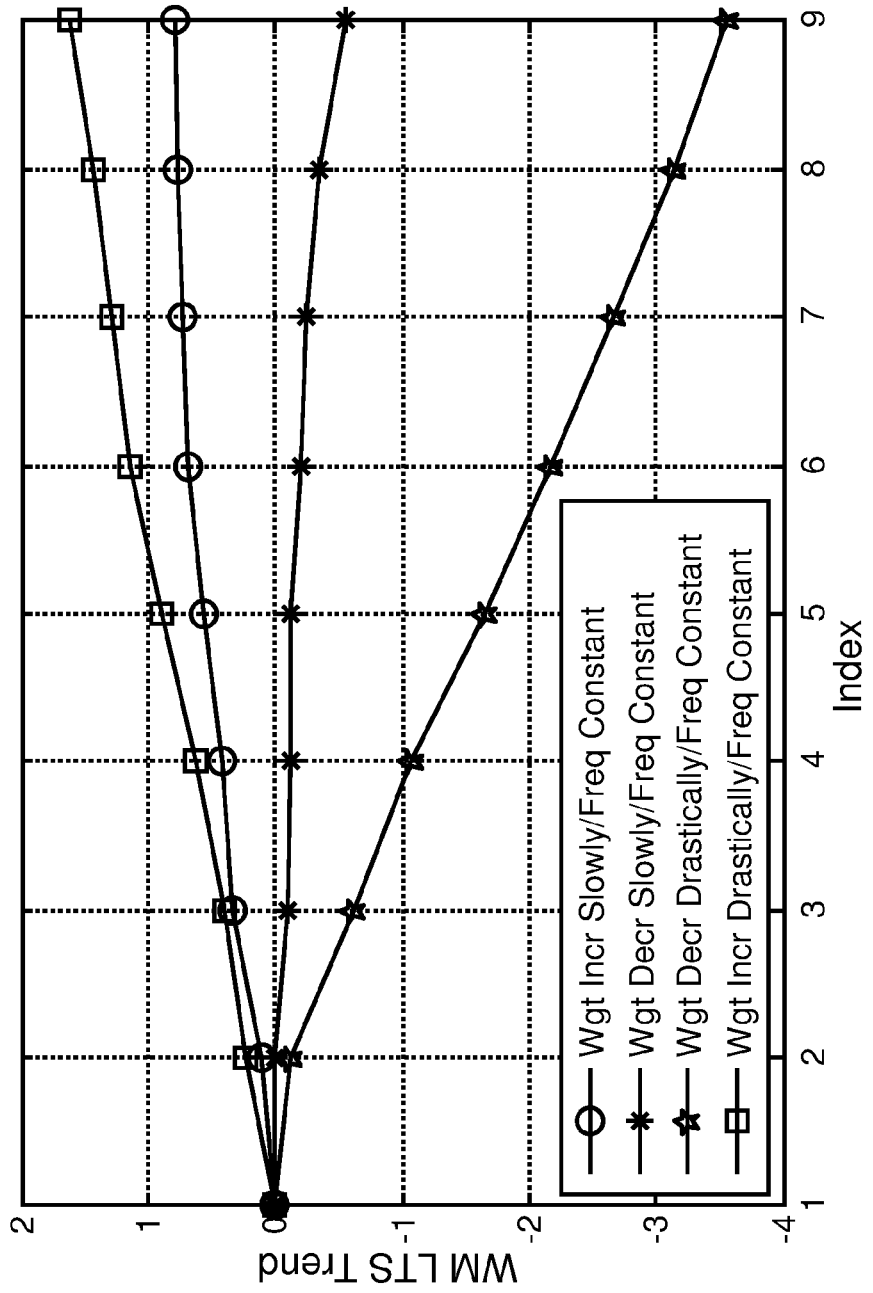
FIG. 6 is a chart showing the behavior of the weighted mean Laplace test statistic when frequency is constant.

The sample size was taken to be arbitrarily N=9. Table 1 below shows the hypothetical combinations of weight/frequency and the expected trend for the variations. The term "frequency" is used as a synonym for the rate of arrival of the events. The flowchart for the technique used to simulate the approach is shown in FIG. 3. The results of using this technique are depicted in FIGS. 4, 5 and 6.

TABLE 1

Weight/Frequency Combination Scenarios

| | TREND | Frequency of Events | | |
|---|---|---|---|---|
| | | Increases | Decreases | Constant |
| Weight | Increases Drastically | Very Fast Incr. | Very Slow Decr. | Fast Incr. |
| | Increases Slowly | Fast Incr. | Slow Decr. | Slow Incr. |
| | Decrease Drastically | Decr. | Very Fast Decr. | Fast Decr. |
| | Decrease Slowly | Slow Decr. | Decr. | Slow Decr. |
| | Constant | Incr. | Decr. | Const. |

As is shown in FIG. 3, when an incipient event is sensed, the event time and additional parameter information (see above) are transmitted to the computer, embedded system, monitoring system or generic computing platform (hereinafter computer) wherein the functionality of the present invention is performed. In a first step, data is read. The data may include arrival times, weights and sample sizes. The flow then proceeds to the processing block labeled "Preprocessing-Normalization of Arrival Times" where the data may be normalized. From there the flow proceeds to the block labeled "Initialize WindowSize=2". The flow then proceeds to a decision block labeled "Is WindowSize<SampleSize?" wherein, if the number of samples (i.e. incipient events) is less than the window size, the process flow returns to the Read data block. If the answer is yes, indicating that the number if incipient events is greater than the predetermined window size, the flow proceeds to a block directly below the decision block that is labeled "Calculate WM LTS and the dynamic threshold DTh" according to equation 6 above for the WM LTS and equations 10-14 for the dynamic threshold. The output of this block goes to a block labeled "Plot the trend" which may optionally output a visual representation of the analysis for review by a human operator. The output also proceeds to a decision block labeled "Is LTS>DTh & AlarmFlag=1?" wherein it is determined whether the calculated WM LTS is greater than the dynamic threshold, and in addition whether the AlarmFlag variable equals 1 (indicating an alarm condition in the previous analysis). As will be seen, the sensitivity of the process may be adjusted by varying the AlarmFlag requirements. According to one embodiment, the AlarmFlag requirement may be set to zero. In such an embodiment, the system will output an alarm the first time the WM LTS is greater than the dynamic threshold. According to other embodiments, if reduced sensitivity (and therefore greater confidence that an alarm really indicates a problem) the AlarmFlag requirement may be greater than 1.

If the answer to the above decision block is No, then the flow proceeds to a block to the left of the decision block that is labeled "AlarmFlag=0" and then to a block directly above this block which is labeled "Window=Window+1" which shifts the window, essentially creating a first in first out buffer or a moving window of a constant sample size. From there the process proceeds to the decision block labeled "Is WindowSize<SampleSize?". Because the window shift has eliminated the oldest event, the system will wait until a new event is read and repeats the steps discussed above. If the answer to the decision block "Is LTS>DTh & AlarmFlag=1?" is Yes, the flow proceeds to a block directly below the decision block labeled "Alarm=Alarm+1 AlarmFlag=1".

The flow then proceeds to a decision block labeled "Is Alarm>Alarm Threshold?" which is directly below the block labeled "Alarm=Alarm+1 AlarmFlag=1". The Alarm Threshold is preset by the user based on the desired sensitivity of the system. If the answer to this decision is No, the flow proceeds directly to the block labeled "Window=Window+1". If the answer to this decision is Yes, the flow proceeds to a block directly below this threshold block that is labeled "Set the alert alarm" and the output of this block goes to the block labeled "Window=Window=1". The alert may be output to any system. According to one embodiment, the alert is output to a utility control room wherein, upon seeing the alert, utility personnel can take proper action to mitigate or eliminate the impact of a catastrophic failure.

In FIG. 4, the WMLTS behavior is shown under various conditions of changes in the weight, given that the frequency of events increases. It is evident that as the weight increases, it assists the event frequency in rising further, thus giving an upward push to the trend trajectory. On the other hand, as the weight decreases, it corresponds to a decreased intensity of the failure and hence brings the trend down.

Similarly, FIG. 5 shows the trend trajectory corresponding to the different conditions of weight change, given that the frequency of events decreases. It can be seen that as the weight decreases, it further decreases the trend corresponding to a reduced failure intensity, while when the weight increases it tries to compete with the frequency of event and the parameter that wins (in the given case—the weight) determines the statistical trend.

Finally, FIG. 6 shows the trend corresponding to the case when the frequency of events are constant while considering different changes on the weighting. This figure shows that changes in weight govern the changes in the trend. Note that in FIGS. 4, 5 and 6, the condition where the weight is constant corresponds to the conventional LTS case and can be considered to be a reference case for comparison purposes. A comparison of the results of the sample cases which are shown in FIGS. 4, 5 and 6 with the expected trends given in Table I shows that these results are coherent with the expected solution and hence reinforce the validity of the equation given herein for the WM LTS computation.

The 2D-LTS Approach

The weighted mean embodiment described above uses weights associated with every incipient failure event. An event occurring at a future time may have a higher degradation effect on the asset. Thus, taking the weight into consideration as a second parameter allows this view to be incorporated into the trend analysis. On the opposite side, the weighted mean method aggregates the effect of arrival times and weights as two independent parameters. Although there exists two degrees of freedom, only one is utilized in the weighted mean embodiment.

Described below is another embodiment for the present invention that uses both degrees of freedom for the incipient failure trend analysis. These two degrees of freedom are denoted in the description below by the parameters par1 and par2.

In order to implement the LTS for two parameters denoted by par1 and par2, a two-dimensional Cartesian space is considered and henceforth referred to as the decision quadrant. Suppose, the x-axis of the decision quadrant is represented by the LTS calculated for part, while the y-axis is represented by the LTS calculated for par2. Then, the set of all LTS values calculated for the two parameters over a growing window would result in a scatter plot on the decision quadrant. Every quadrant would represent a different trend for the two parameters—increasing, decreasing, or constant. Equations (7) to (9) help to formalize a framework for this approach.

$$2DLTS = \left\{ \frac{\left(\frac{1}{N}\sum_{i=1}^{N} par1_i - \frac{par1_{N+1}}{2}\right)}{par1_{N+1} \cdot \sqrt{\frac{1}{12N}}} \right\} + j \left\{ \frac{\left(\frac{1}{N}\sum_{i=1}^{N} par2_i - \frac{par2_{N+1}}{2}\right)}{par2_{N+1} \cdot \sqrt{\frac{1}{12N}}} \right\} \quad (7)$$

Similar to the conventional LTS, one parameter would always be the time of the event denoted by t. Replacing par1 and par2 by t and par, respectively.

$$2DLTS = \left\{ \frac{\left(\frac{1}{N}\sum_{i=1}^{N} t_i - \frac{t_{N+1}}{2}\right)}{t_{N+1} \cdot \sqrt{\frac{1}{12N}}} \right\} + j \left\{ \frac{\left(\frac{1}{N}\sum_{i=1}^{N} par_i - \frac{par_{N+1}}{2}\right)}{par_{N+1} \cdot \sqrt{\frac{1}{12N}}} \right\} \quad (8)$$

The above equation can be represented as $$2D\ LTS = LTS_{arrivalTime} + jLTS_{par} \quad (9)$$

Figure 7:
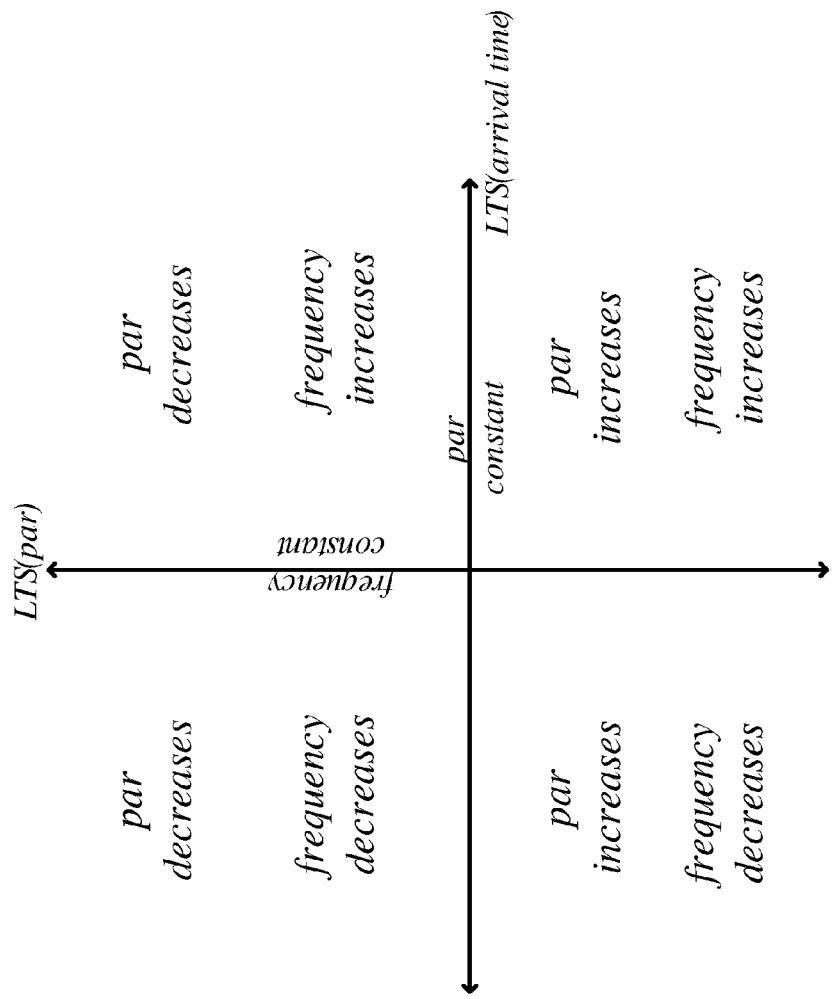
FIG. 7 is a decision quadrant to determine the nature of the trend.

As mentioned previously, every quadrant of the decision quadrant corresponds to a different change in the two parameters as depicted in FIG. 7. In the figure, the frequency of events associated with arrival times is one parameter (corresponding to incipient event arrival times) and the other parameter (discussed above) is generically represented as par. With these two independent parameters, a dual threshold algorithm is used for initiating the alarm. The flowchart for this embodiment of the present invention is given in FIG. 8. The two thresholds for arrival time and par define a square boundary in the Cartesian coordinates that is dynamically increasing in size with the increasing number of samples, as shown in FIG. 9. If the computed LTS values fall inside this boundary, it is implied that the incipient activity level has not yet reached the alarm time and thus the monitoring needs to be continued.

The datasets that were used in the weighted mean approach were also used for behavioral exploration of the 2D-LTS approach and the decision table. The results of these tests were plotted in one graph and are shown in FIG. 11. The decision quadrant shown in FIG. 7 can be used as a template to determine the nature of the trend. For instance, if most of the sample data values results in a scatter plot concentrated in the fourth quadrant, this would imply that both the event frequency and the parameter value are increasing.

Figure 8:
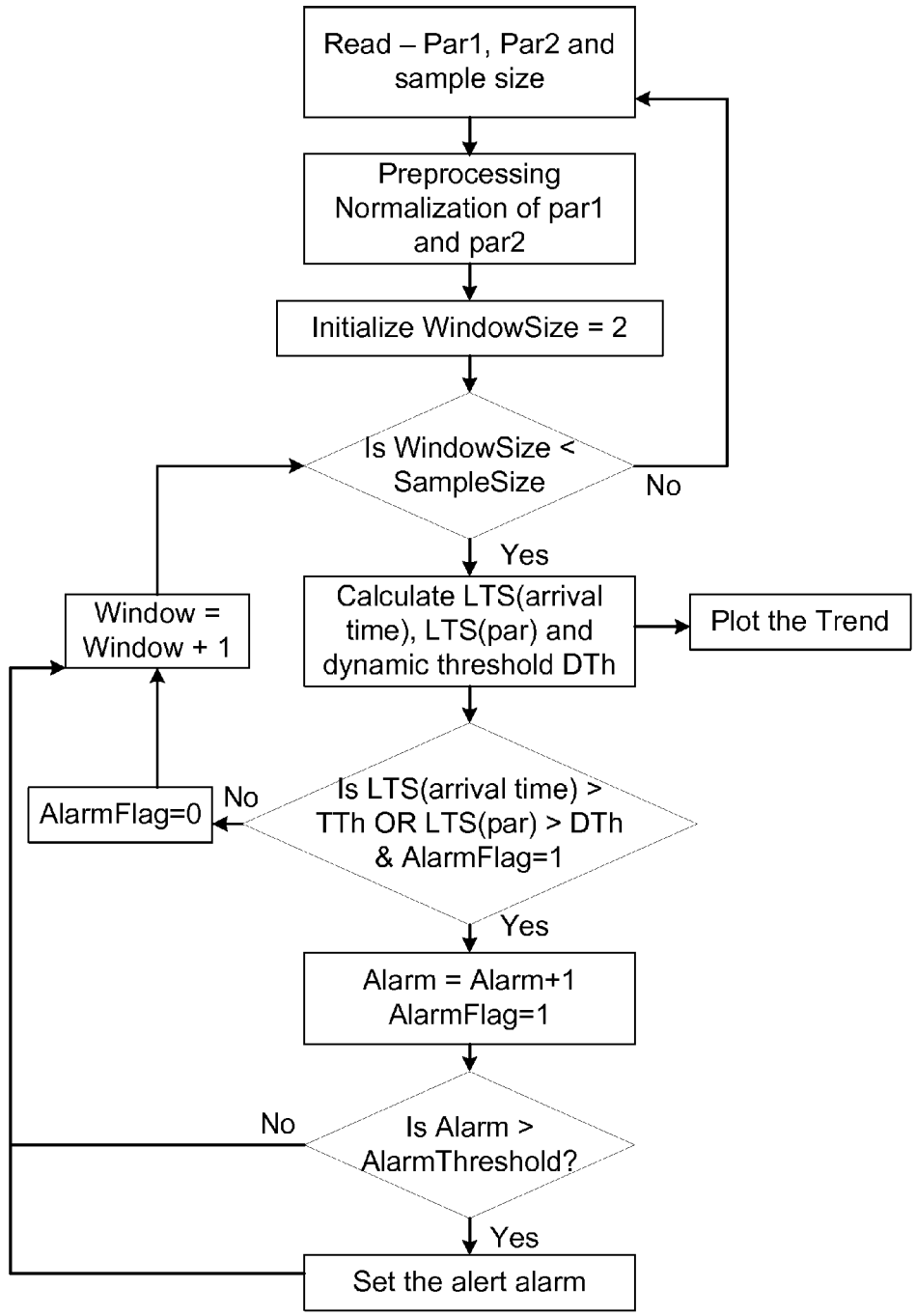
FIG. 8 is a flowchart for trend analysis using 2D Laplace test statistic approach.
Figure 9:
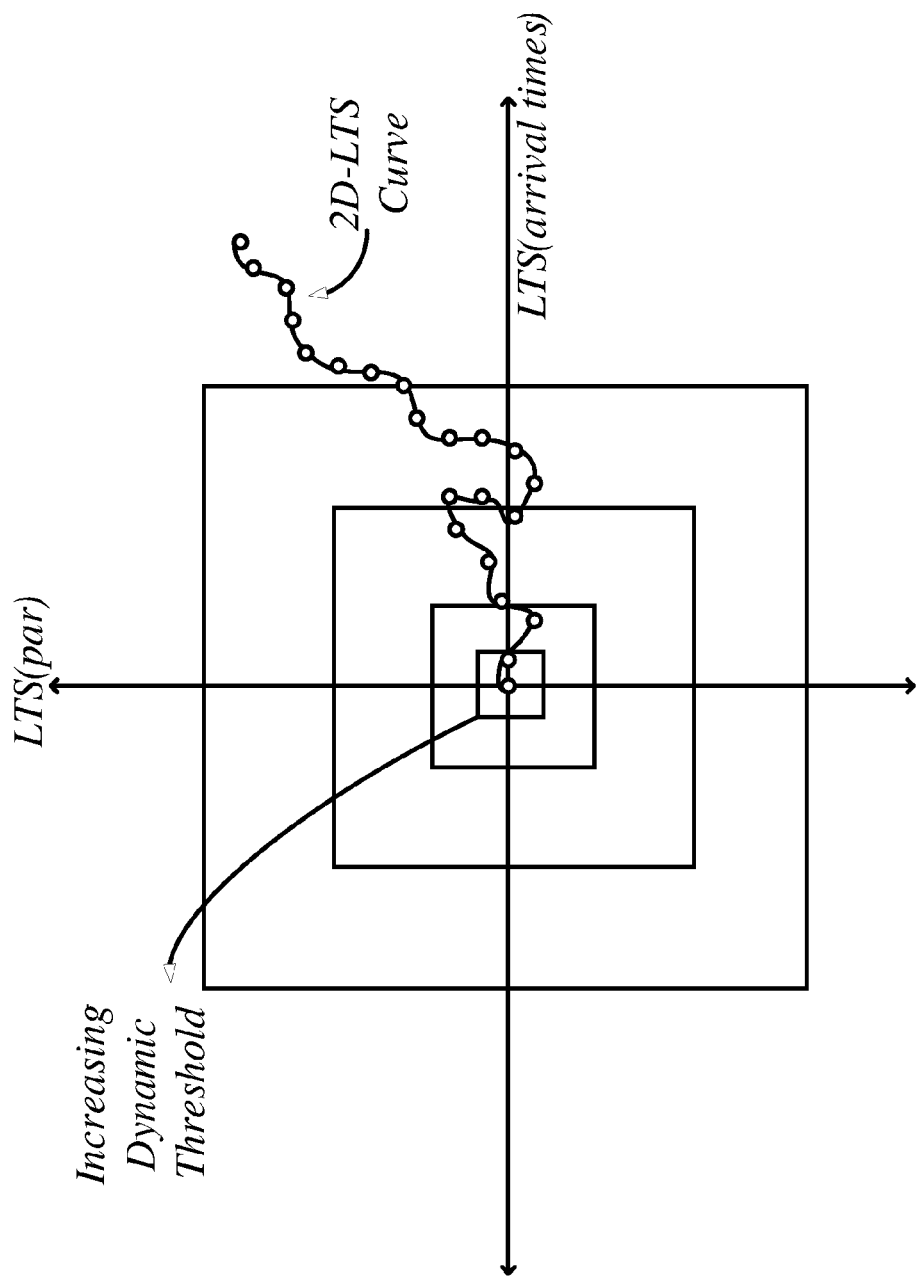
FIG. 9 is a chart showing dynamic threshold enclosures for a 2D Laplace test statistic approach.

With reference now to the flowchart of FIG. 8, as discussed above, when an incipient event is sensed, the event time and additional parameter information (see above) are transmitted to the computer wherein the functionality of the present invention is performed. The process beings at the block labeled "Read-Part, Par2 and sample size". The flow then proceeds to a processing block labeled "Preprocessing-Normalization of par1 and par2" which is followed by a block labeled "Initialize WindowSize=2". The latter block is immediately followed by a decision block labeled "Is WindowSize<SampleSize?" wherein, if the number of samples (i.e. incipient events) is less than the window size, the process flow returns to the block labeled "Read-Part, Par2 and sample size". If the answer to this decision is Yes, indicating that the number if incipient events is greater than the predetermined window size, the flow proceeds to a block that is directly below the decision block and is labeled "Calculate LTS(arrival time), LTS(par) and the dynamic threshold DTh". The LTS (arrival time) and LTS (par) are calculated according to equations 7 and 8 above. The dynamic threshold may be calculated according to equation 4 or 10-14 below. The output of this block is to a block to its right labeled "Plot the trend" which may optionally output a visual representation of the analysis for review by a human operator. The output also proceeds to a decision block directly below it labeled "Is LTS(arrival time)>DTh Or LTS(par)>DTh & AlarmFlag=1.

If the answer to the question asked in that decision block is no, the flow proceeds to a block to the left of the decision block that is labeled "AlarmFlag=0" and from there to a block directly above this block labeled "Window=Window+1" which shifts the window, essentially creating a first in first out buffer or a moving window of a constant sample size. From there the process proceeds to the decision block labeled "Is WindowSize<SampleSize?". Because the window shift has eliminated the oldest event, the system will wait until a new event is read and repeats the steps discussed above. If the answer to the question asked in the decision block labeled "Is LTS(arrival time)>DTh Or LTS(par)>DTh a AlarmFlag=1? is Yes then the flow proceeds to a block directly below the decision block that is labeled "Alarm=Alarm+1 AlarmFlag=1". The output of this block goes directly to a decision block labeled "Is Alarm>Alarms Threshold?". If the answer to this decision is No, the output of the decision block goes directly to the block labeled "Window=Window+1" and if the answer is Yes, the output goes directly to a block labeled "Set the alert alarm". The output of the "Set the alert alarm" block goes directly to the block labeled "Window=Window+1".

The extensions described herein were validated and demonstrated using field data from an underground feeder. A data collection system (shown in FIG. 10) installed in a select distribution substation was used to capture and collect voltage and current oscillographic data from an underground feeder at the substation level. The feeder was fed from a 230/13.2 kV substation and predominantly composed of underground cable runs (91.5%). Typically, four feeders are fed from the same bus. The mainline cable runs are typically composed of a mixture of older double three-phase circuit 500 kcmil unjacketed cable with aluminum conductor and of more recent 1000 kcmil jacketed cable with copper or aluminum conductor. All cabling includes XLPE insulation.

Figure 10:
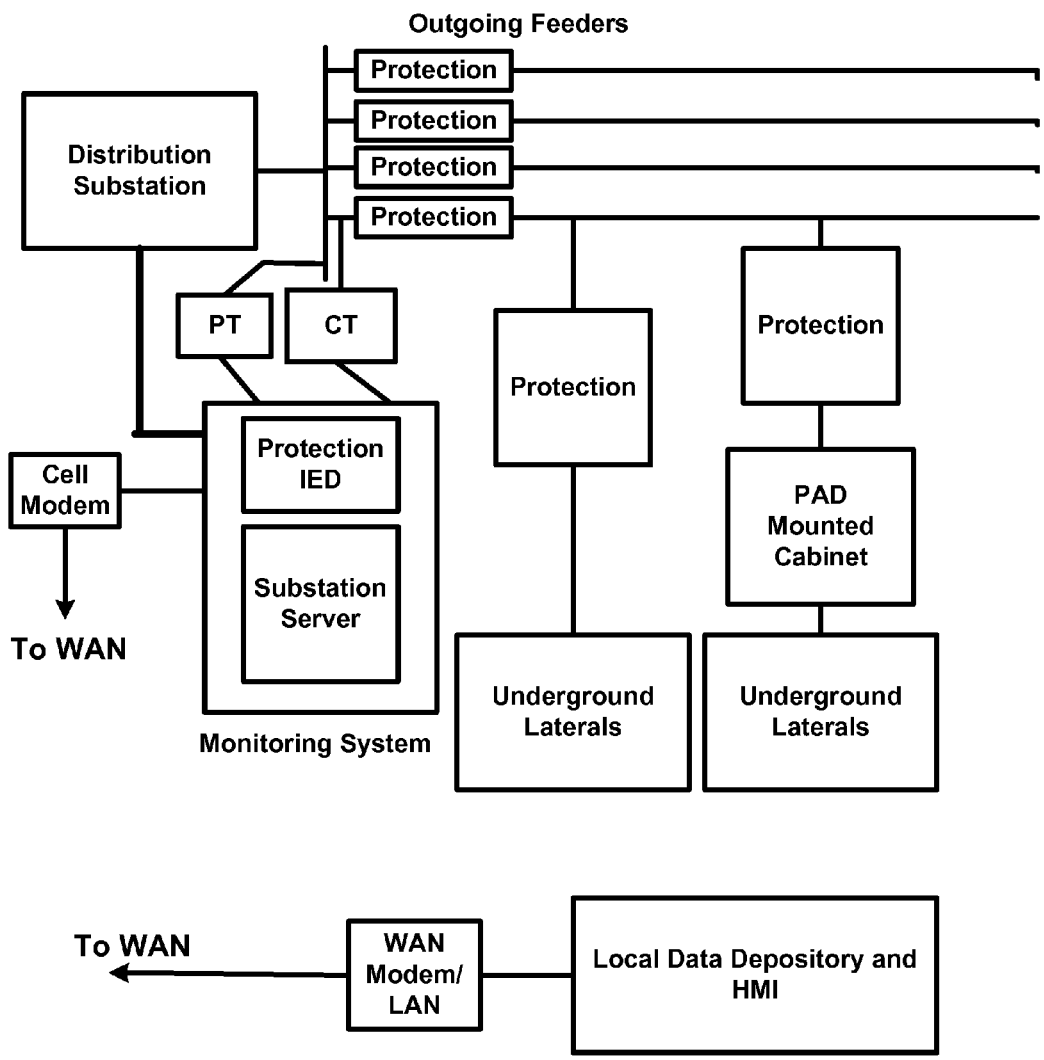
FIG. 10 is a monitoring system for implementing the Laplace test statistic of the present invention.

The monitoring system of FIG. 10 has Intelligent Electronic Devices (IEDs) for protection or monitoring or both, a substation server, a communications network, a local data depository, a local HMI (Human Machine Interface) which for example could be a monitor, keyboard, and/or mouse and a personal computer. The substation server is connected to the feeders by IEDs which in turn are connected to current transformers (CTs) and potential transformers (PTs). Connections for one feeder are explicitly shown in FIG. 10. The local HMI and the substation server may use wireless or wired technology to communicate with each other. The system runs continuously and monitors the feeder for abnormalities predefined and programmed into the triggering logic. The abnormalities (incipient events) are essentially intermittent current spikes that are not of sufficient magnitude and duration to cause conventional protection equipment to operate. Once triggered, it captures a fault record by exception according to the pre-determined traps. The IEDs used are essentially feeder protection relays that are set to acquire data at a rate of 1920 Hz. The basic three-phase voltages and phase currents including the neutral current are recorded and stored in the well known COMTRADE files. The data collected by the IEDs are retrieved and saved regularly by the substation server computer and later downloaded to a local depository over a secure communications network.

The feeder was monitored for a period of 10 months and a total of 141 incipient cable failure events were recorded during this period. All the events were found to be related to an incipient failure activity related to a cable splice with no corresponding record in the utility outage data. At the conclusion of this period, a catastrophic failure caused by the incipient splice failure activity occurred on the feeder that blew a 65 A fuse that was installed as an extra protection layer on this feeder. Due to this fuse protection, this fault did not result in a feeder outage and therefore fewer customers were affected by the fault. The failure location was found at a joint on a run of single three-phase circuit 500 kcmil AL unjacketed cable.

The two embodiments of the present invention described herein were applied to the data collected from these incipient failures. For calculating the LTS values, a total sample size of 141 samples was used, while the catastrophic failure event was excluded from the calculations. Furthermore, a growing window that begins with a size of 2 samples and grows up to 141 samples was applied in the algorithms.

With reference to FIG. 12 (upper) the trajectory plot is shown for the windowed LTS calculated from the arrival times of the recorded incipient events. The trend grows as the arrival times increase, corresponding to an increase in the frequency of events. FIG. 12 (middle) shows the windowed LTS calculated using the normalized peak fault current values over the entire period. The peak fault current was normalized by taking the rms load current during pre-fault as the base value. It can be seen that the trend increases with time, an indication of an increase in the level of degradation due to the increased magnitude of the normalized current peaks. Finally, FIG. 12 (bottom) shows the weighted mean LTS that was calculated using the normalized current peaks as the weights. It is evident that this plot also has an increasing trend, but the magnitude of the increase is more towards the end, where an increased trend in the weight i.e. normalized peak fault current supports the increasing event frequency and pushes the trend upwards. The trajectory curve shows an increased level of incipient activity towards the end, just before the catastrophic failure.

The same number of samples and growing window were applied to the 2D-LTS approach and the result is shown in FIG. 13. The figure shows the trajectory of the points on the scatter plot using arrows. The scatter plot remains mainly in the fourth quadrant especially towards the conclusion of the incipient faults. This implies an increasing trend for the event frequency and normalized peak fault current.

Further, the WMLTS algorithm for alarm generation was used to obtain the alarm signals; these have been plotted in FIGS. 14 and 15 for different thresholds. It can be seen that the weighted mean approach sets an alarm signal in a number of occasions and faster than the windowed LTS method by taking into account the degradation factor in the form of weights. For prediction purposes, having multiple alarm points or threshold violations is an advantage because it allows for implementation of a relatively robust alarm signal that is immune to outliers. For example, one can set the criteria for alarm such that it requires more than one threshold violation.

For a threshold set at 50% of the upper bound, the conventional LTS does not show any alarm signal as seen from FIG. 15. On the contrary, the WMLTS will trigger the alarm in a number of occasions before the eventual failure. The point is that by incorporating weights, the sensitivity of detection to the threshold values can be reduced and this is important as in retrospect it is not known beforehand how large the LTS values will grow before the eventual failure.

Finally, the 2D-LTS algorithm for alarm generation was executed to obtain the dynamic threshold enclosures depicted in FIG. 16. The alarms are generated when either parameter violates the threshold weeks before the eventual failure.

As is described above just before equation (4), there is an empirical upper bound for the LTS and an estimate of that upper bound for the LTS values computed over N number of events is given herein. Consider a series of events occurring in a system, as shown in FIG. 17. The frequency of these events increases with time and are placed on the time axis in a partitioned manner. The first partition comprising of 'm' widely separated events, while the second partition consisting of 'p' events very close to each other. Such that p>>m.

The task of finding the upper bound of the LTS reduces to a limit problem given by $$\lim_{p>>m} \frac{1}{N} \sum_{i=1}^{N} t_i \qquad (10)$$

$$\text{Replacing } N \text{ by } p+m = \lim_{p>>m} \frac{1}{(p+m)} \sum_{i=1}^{p+m} t_i \qquad (11)$$

$$\text{Expanding the summation} = \lim_{p>>m} \frac{t_1 + t_2 \ldots + t_m + t_{m+1} + \ldots + t_N}{p+m} \qquad (12)$$

In the limit, alt the p event points approach each other and concurrently are greater in magnitude as compared to the m event times. Thus, the expression can be further reduced to $$\approx \frac{p t_N}{p+m} \qquad (13)$$

$$\lim_{p>>m} \frac{1}{N} \sum_{i=1}^{N} t_i \approx t_N$$

The above result is also evident from FIG. 18.
Replacing the value found in equation (4) back into the LTS expression, we get $$LTS_{max} \approx \sqrt{3N} \qquad (14)$$

The maximum value found above is the extreme limiting value in theory and in the case of practical systems it is not expected to be violated. Since incipient faults in physical systems show an intermittent on/off nature, the LTS values will fluctuate but may never reach this upper bound. For practical purposes, only a percentage of this maximum value can be used to set the threshold for alarming purposes. In accordance with the present invention, it was found that a threshold of 40%-50% of the upper bound would provide good detection characteristics. It should be appreciated, however, that other threshold percentages may be used. In general, the specifics of the application and risk of missing the detection point should be considered when determining the appropriate percentage.

As is described above, identifying and quantifying the trend of occurring incipient faults are key to successful prediction and alarming by an automated temporal monitoring system, such as the system shown in FIG. 10, that uses the present invention to monitor and analyze these faults on distribution assets on a regular basis. A general flowchart for the operation of such a monitoring system is shown in FIG. 19.

As is shown by the block labeled "Read data: parameters, arrival times" the monitoring system constantly reads the data and associated parameters within an instant of an incipient fault and records the time of arrival and event parameters in a database shown in FIG. 19 by the cylindrical block labeled "Database (History)". The flow then proceeds to a decision block labeled "Enable continuous monitoring?" When the answer to that question is yes the trend analysis is enabled and the flow proceeds to the block labeled "Analyze arrival times and trends" where the history data and time of the most recent event are used for identifying the trend and its trajectory over time using the methods disclosed in FIG. 3 or 8. The flow then proceeds to the block labeled "Determine/update threshold(s)" where the hard thresholds are calculated and updated every time a new event becomes available. The threshold(s) are set to check the magnitude of the trend.

In the decision block labeled "Is/are the threshold(s) violated?") that immediately follows the determination of the thresholds, a decision is made as to whether a threshold violation has occurred. To make the detection robust and immune to outliers and noise effects, there may be a requirement to check for multiple (more than one) threshold violations. If the condition is met, the flow proceeds to block labeled "Issue an alert signal to a local/remote operator" where an alarm signal is generated indicating a persisting incipient event activity in the monitored asset or system. The alarm can be generated locally at the device location or it can be sent to a remote location where network operators watch and monitor network health and status.

As is shown in the block labeled "Take proactive action to mitigate or eliminate the impact" that follows the block which causes the generation of the alarm signal, upon the occurrence of the alarm signal, the operator takes a proactive action to address the situation and mitigate the impact of the impending failure. The proactive measures in response to the alert can be as simple as close monitoring of the asset or sending a crew out to examine the monitored device or system in question.

As can be appreciated from the description herein, the present invention has extended the conventional Laplace Test Statistic for trend analysis and prediction of incipient faults in power systems. The LTS uses the arrival times of incipient failure events as a parameter for determining the statistical trend. This way, each event is treated equally in terms of its contribution to the eventual failure. The extensions of the present invention consider a situation where two parameters that are believed to contribute explicitly to the eventual failure are monitored. To include the combined effect of two parameters in the trend analysis, two extensions are described herein and their applications were described and demonstrated using field data from an underground feeder.

The results show that the weighted mean approach provides robustness against outliers for alarm generation and can be faster than the conventional LTS. On the other hand, the 2D-LTS approach increases the flexibility of the trend analysis by increasing the degrees of freedom. The developed extensions applied on actual incipient failure events provide promising results for prediction of the impending fault.

As will be appreciated by one of ordinary skill in the art, various functionality of the present invention may be embodied as or take the form of a computer program product taking the form of computer readable medium having computer-readable instructions stored thereon which, when executed by a processor, carry out the operations of the present inventions as previously described. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of performing trend analysis on incipient events in a power network, the method comprising:
receiving data including a first parameter and a second parameter, said first parameter representing the time of an incipient event and said second parameter representing a characteristic of said incipient event;
determining a laplace test statistic using said first parameter and said second parameter;
comparing said laplace test statistic against a threshold;
outputting an alarm signal if said laplace test statistic is greater than said threshold; setting an event window size, wherein said event window operates according to first-in-first-out principle; and
wherein the laplace test statistic is determined using only data from said event window.

2. The method of claim 1 wherein said second parameter is incorporated as a weighting factor for said first parameter.

3. The method of claim 2 wherein said laplace test statistic is a weighted laplace test statistic (WM LTS) and is calculated according to:

$$WMLTS = \frac{\left(\frac{\sum_{i=1}^{N}\omega_i t_i}{\sum_{i=1}^{N}\omega_i} - \frac{t_{N+1}}{2}\right)}{t_{N+1}\cdot\sqrt{\frac{1}{12N}}}.$$

4. The method of claim 1 wherein said laplace test statistic is determined using said first and said second parameters in two dimensional Cartesian space.

5. The method of claim 4 wherein said laplace test statistic is calculated according to:

$$2DLTS = \left\{ \frac{\left(\frac{1}{N}\sum_{i=1}^{N} par1_i - \frac{par1_{N+1}}{2}\right)}{par1_{N+1} \cdot \sqrt{\frac{1}{12N}}} \right\} + j \left\{ \frac{\left(\frac{1}{N}\sum_{i=1}^{N} par2_i - \frac{par2_{N+1}}{2}\right)}{par2_{N+1} \cdot \sqrt{\frac{1}{12N}}} \right\}.$$

6. The method of claim 1 wherein said second parameter is the energy of the incipient event.

7. The method of claim 1 wherein the second parameter is a value indicative of environmental conditions at the time of the incipient event.

8. The method of claim 1 wherein the second parameter is a value indicative of baseline load at the time of the incipient event.

* * * * *